Nov. 22, 1938.   G. B. SAYRE   2,137,628
WINDSHIELD CLEANER
Filed Sept. 25, 1934   3 Sheets-Sheet 1
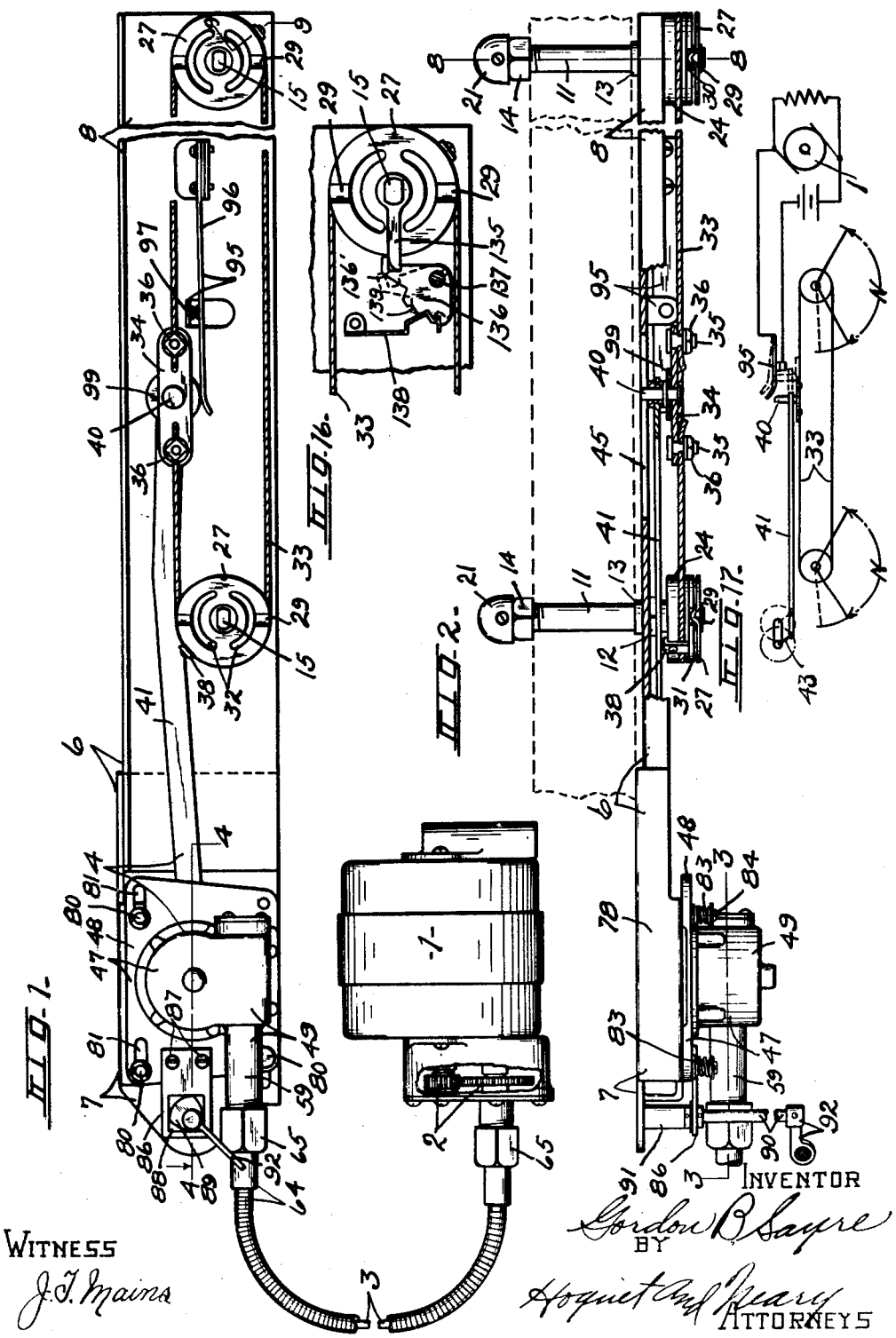
INVENTOR
Gordon B Sayre
BY
Hoquet and Neary
ATTORNEYS
WITNESS
J. J. Mains

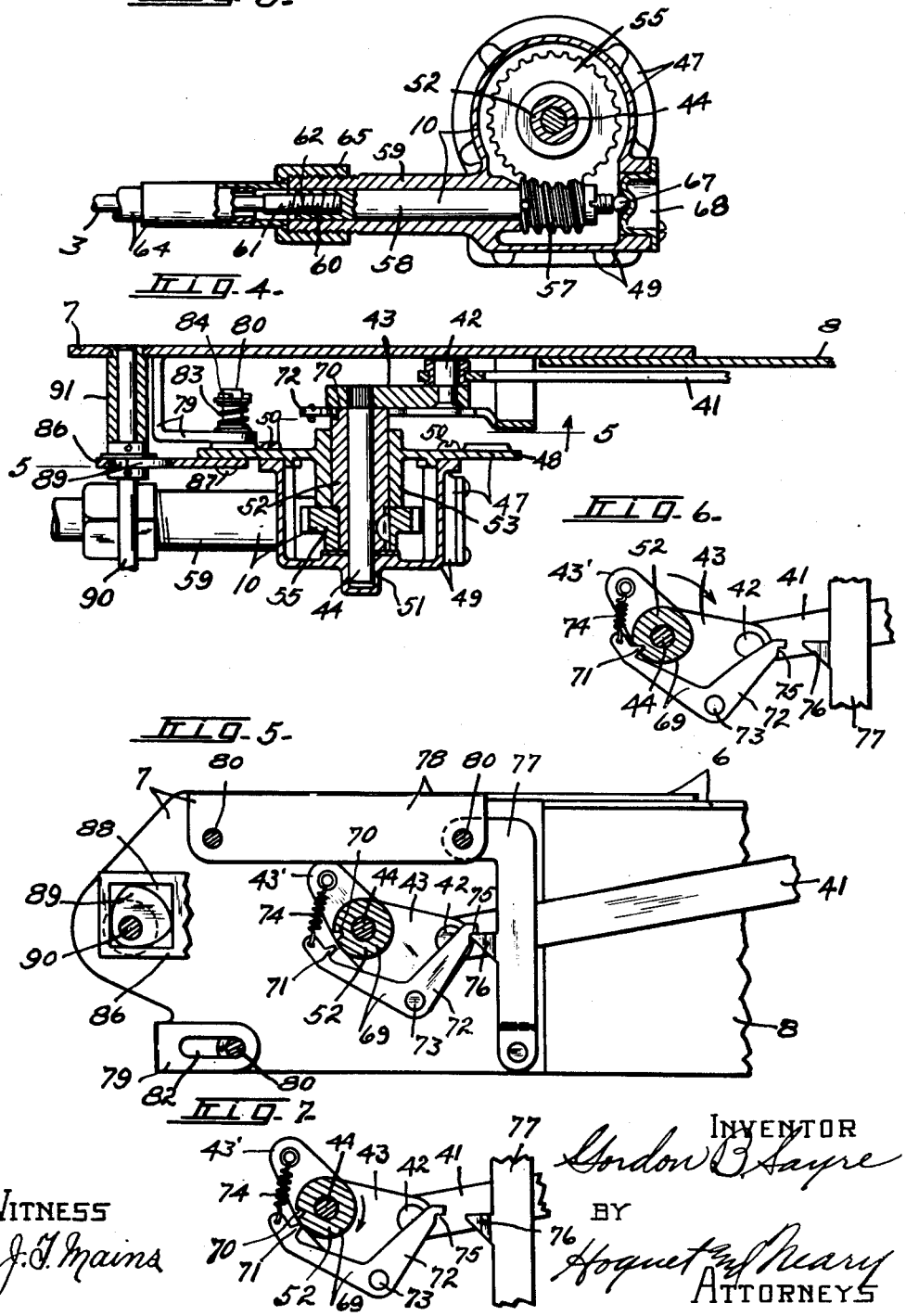

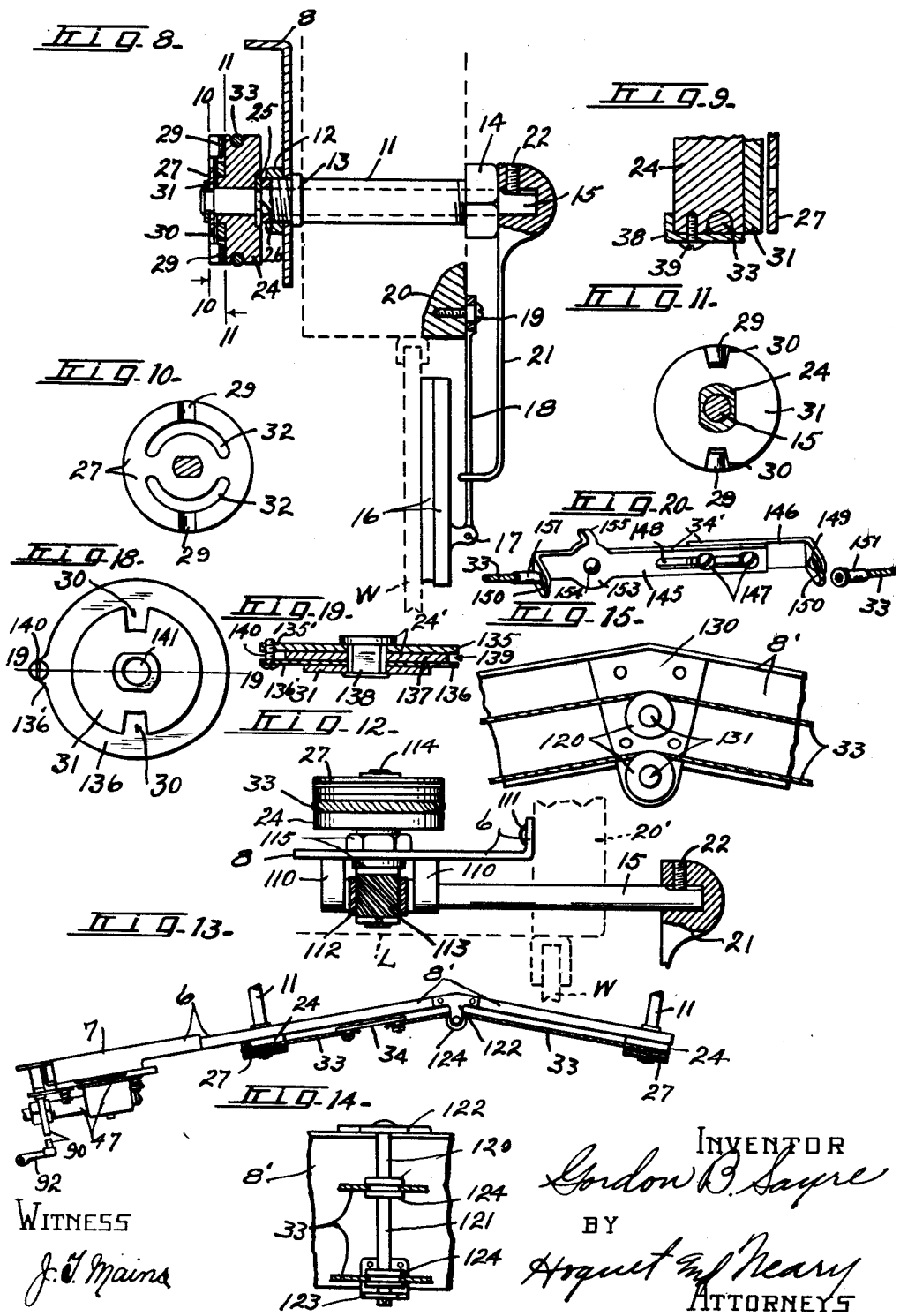

Patented Nov. 22, 1938

2,137,628

UNITED STATES PATENT OFFICE 2,137,628

WINDSHIELD CLEANER

Gordon B. Sayre, Syracuse, N. Y.

Application September 25, 1934, Serial No. 745,430

12 Claims. (Cl. 15—255)

This invention relates to improvements in windshield cleaners and pertains more particularly to a remote drive type of a windshield cleaner in which the power unit, such as an electric motor, is disposed at a distance from the cleaner element.

The main objects of this invention are to produce a windshield cleaner of the above-mentioned type which is simple, durable and economical in construction, positive, uniform and quiet in operation, and that may be readily attached in operative relation with windshields of different contours and at either the upper or lower edge thereof.

A more specific object of the invention resides in providing a dual windshield wiper of the above-mentioned class having a novel and improved power transmission means for producing oscillatory movement of the wiper blades.

Another object of the invention is to provide a windshield cleaner having operating means adapted to move the cleaner arms to one side of the wiping zone into substantially a horizontal position in a parking zone at the end of each wiping period.

Still another object is to provide a windshield cleaner mechanism with control means for automatically stopping the operation of the windshield cleaner motor when the cleaning elements are in a predetermined position in the parking zone.

A further specific object of the invention resides in providing means for locking the wiper blades in the parked position whereby the blades will be securely maintained out of the line of vision against the action of the wind or the air stream.

Another object is to provide a windshield cleaner mechanism wherein the drive motor may run idle during the initial operation thereof so as to obtain normal running speed before picking up the load incident to operating the cleaner elements.

Still another object is to provide a dual windshield cleaner wherein the operation of one of the wiping blades may be discontinued without affecting the operation of the other blade.

Other objects and advantages pertaining to the details of the structure and to the form and relation of the parts thereof will more readily appear from the following description taken in connection with the accompanying drawings in which:

Figure 1 is a broken elevation of a windshield cleaner embodying the various features of this invention.

Figure 2 is a plan view with portions thereof broken away and in sections of the power transmission mechanism illustrated in Figure 1.

Figure 3 is a detail vertical sectional view taken in the plane of the line 3—3, Figure 2.

Figure 4 is a detail horizontal sectional view taken on the line 4—4, Figure 1.

Figure 5 is a vertical detail sectional view taken substantially in the plane of the line 5—5, Figure 4.

Figures 6 and 7 are detail vertical sectional views of my novel time clutch illustrating the same in different operative positions.

Figure 8 is a detail transverse sectional view taken on the line 8—8, Figure 2.

Figure 9 is an enlarged detail sectional view taken on line 9—9, Figure 1.

Figures 10 and 11 are detail sectional views taken respectively on lines 10—10 and 11—11, Figure 8.

Figure 12 is an end elevation, partly in section, of one end of the supporting housing and adjacent drive mechanism illustrating the adaptability of my device to a vehicle body of modified structure.

Figure 13 is a plan view illustrating my novel windshield cleaner applied to a sectional or V-shaped windshield.

Figure 14 is a detail inner face view of the cable guide means positioned at the apex of the windshield frame shown in Figure 13.

Figure 15 illustrates a modified form of cable guide means adapted to be used at the vertex of a V-type windshield when the wiper blade drive is positioned as illustrated in Figure 12.

Figure 16 is a modified form of structure associated with one of the wiper blades whereby said blade may be rendered inoperative without affecting the operation of the other blade.

Figure 17 is a diagrammatic view illustrating the operation of the wiper blades and the mechanism for operating the same.

Figure 18 is a face view of a modified form of drive sheave for the cleaner.

Figure 19 is a transverse sectional view taken on line 19—19, Figure 18.

Figure 20 is a perspective view of a modified form of tie plate for the drive cable and illustrating the ends of the cable associated therewith.

In carrying out the above-mentioned objects in the manner shown in the drawings, I have produced a windshield cleaner comprising a simple, compact power transmission mechanism for oscillating a pair of wiper blades that may be readily incorporated in the vehicle body proper adjacent either side of the windshield and a drive for actuating the mechanism to move the wipers back and forth on the windshield derived from a remote source.

My novel windshield cleaner may be driven from any convenient movable member of the vehicle such as the motor for driving the vehicle or the power transmission mechanism actuated by said motor, or as illustrated, the source of power may comprise an electric motor 1 which is operatively connected by a train of gears 2 to one end of a flexible shaft 3 having the other end thereof connected with a transmission mechanism 4 in a manner presently described. The motor 1 may be mounted on the vehicle body at any convenient location preferably where it may be readily accessible for servicing and at a place and in such a manner that very little or no noise produced by the motor in operation will be transmitted to the occupants of the vehicle such for instance, as under the engine hood, not shown. By thus mounting the windshield cleaner motor, it will be readily understood that the motor may be of ample size to easily drive the wiper blades at substantially constant speed under all weather or glass conditions or any variation in voltage within certain limits.

The hereinbefore mentioned transmission mechanism 4 comprises a simple support or a housing 6 formed in this instance of two substantially L-shaped members 7 and 8 having their adjacent inner ends secured together in overlapping relation by any suitable means as by electric welding, rivets or the like. One of the supporting members as 7 is of substantially uniform construction for all models of windshield cleaners and is adapted to operatively support a transmission unit 10 while the other member 8 of the support or housing carries the wiper blade shafts and may be made of longer or shorter length depending upon the structure of the mechanism to which the wiper blades are applied. The housing 6 and mechanism carried thereby may be secured in operative relation with a windshield by any suitable means such as a pair of supporting sleeves 11. Each sleeve is secured at one end to the housing 6 by a nut 12 screw threaded on the sleeve and which cooperates with a shoulder 13 provided on the sleeve adjacent one end thereof to clamp the housing therebetween.

The sleeves, as indicated in Figures 2 and 8, are of sufficient length to extend through the adjacent portion of the vehicle body and are clamped in position to said body between the shoulder 13 and a nut 14 screw threaded on the opposite or outer end of each sleeve. The sleeves 11 are not only used to support the wiper blade transmission mechanism but are also utilized as bearing supports for the wiper shafts 15 which extend through said sleeves for rotary movement therein and, therefore, the sleeves are preferably spaced apart a distance corresponding to the desired spacing of the wiper blade shafts. Each of the wiper blade shafts 15, as shown more clearly in Figure 8, is extended at both ends beyond the corresponding sleeve 11 so that a wiper blade may be operatively connected to the outer ends of the shafts while a suitable drive mechanism is connected to the inner ends thereof.

The wiper blades as 16 may be constructed in any suitable manner and may be connected with the shafts 15 by an arm or otherwise suitable mechanism and as illustrated in the drawings, the blades 16 are pivotally connected as at 17 to one end of a rock arm 18 which has the other end thereof pivotally connected as by the shouldered screw 19 to the windshield frame or casing 20 in spaced relation to the axis of the wiper shaft 15.

A drive arm 21 is removably secured as by a set screw 22 to the outer end of each shaft 15 and has the outer or free end thereof operatively connected in any suitable manner with the rock arm 18 of the respective blade 16 between the pivots 17 and 19 for transmitting motion from the shaft 15 to said rock arm and wiper blade.

The drive mechanism for each wiper shaft 15 comprises, in this instance, a sheave 24 which is loosely mounted on the respective shaft intermediate a split or U-shaped washer 25 mounted in an annular groove 26 provided in each shaft 15 in spaced relation to the inner end thereof and a clutch plate 27 fixedly secured to the outer end of the shaft.

The clutch plate 27 is fixed to the shaft 15 so as to move in unison with said shaft and is preferably formed of thin spring metal and is provided with diametrically disposed inwardly extending teeth or bosses 29 formed by stamping a marginal portion of the plate laterally and which are adapted to extend into corresponding apertures 30 formed in a companion clutch plate 31 secured to the outer face of the corresponding sheave 24.

The outer clutch plate 27, as shown more clearly in Figure 10, is preferably provided with diametrically disposed arcuate slots 32 adjacent each tooth 29 to render the plate resilient whereby the adjacent portion of the plate may more readily flex for permitting the teeth to move outwardly out of engagement with the apertures 30 to permit relative movement of the shaft 15 and clutch plate 31 and, therefore, the sheave 24 when the resistance to the shaft 15 becomes excessive so as to eliminate the possibility of straining or injuring the parts associated therewith.

The shafts 15 are operatively connected together so as to move in unison by means of a flexible cable 33 composed of twisted wire strands or the like and which passes around the sheaves 24. The ends of the cable 33 are fixedly clamped to a tie plate 34 by means of clamping bolts 35 mounted in the tie plate 34 adjacent the ends thereof. Each bolt 35 is provided with a diametrically disposed hole adapted to receive an end of the cable which is clamped to the bolt by a nut 36 screw-threaded on the outer end of the bolt, as illustrated in Figures 1 and 2.

The cable 33 is tightly mounted on the sheaves 24 so as to frictionally drive said sheaves and the wiper shaft 15 connected therewith and in order that there will be no possibility of slippage between the cable and sheaves, I have provided each sheave with a clamping plate 38 adapted to extend across the face of the sheave and the adjacent portion of the cable 33 and is clamped in position by a screw 39.

In order that the cable 33 may be operatively connected with the actuating mechanism as the hereinbefore mentioned transmission unit 10, I have provided the tie plate 34 with a stud 40 which extends, in this instance, inwardly toward the housing member 8 and has rotatively mounted thereon one end of a pitman 41 which extends longitudinally of the housing 6 and has the other end thereof rotatively connected to a crank pin 42 mounted in the outer end of the crank arm 43 which, in turn, is secured to one end of a crank shaft 44 mounted in the transmission unit 10.

It will, therefore, be seen that any rotary movement of the crank shaft 44 will produce a corresponding reciprocating movement of the tie plate 34 and, therefore, the cable 33 through the medium of the crank arm 43 and pitman 41, and in order that the tie plate and adjacent portion of the cable 33 will be supported during the reciprocating movement thereof the stud 40 is of such a length as to extend beyond the pitman 41 into an elongated slot 45 provided in the adjacent portion of the housing member 8 in a plane extending parallel with the normal position of the adjacent run of the cable 33.

The crank shaft 44 is mounted in a case 47 comprised of two sections 48 and 49 which may be removably secured together in any suitable manner as by screws 50. One end of the shaft 44 is journaled as at 51 in the case section 49 and the shaft extends from the journal 51 through a sleeve 52 which is journaled on the shaft 44 and in the wall of the case section 48 which is provided with a hollow lateral extending boss 53 adapted to receive the collar 52 therethrough.

The sleeve 52 has mounted on the inner end thereof a worm gear 55 positioned within the case 47 and which is secured to the collar by any suitable means to rotate therewith. The worm gear 55 is in meshing engagement with the worm 57 which is fixedly secured to a drive shaft 58 journaled in an extension 59 secured to or made integral with the case section 49. The shaft 58 extends outwardly through the extension 59 to substantially the end of said extension and is provided with a threaded aperture 60 in the outer end thereof in which is screw threaded the adjacent end of the flexible shaft 3. The shaft 3 has one end operatively connected in any well-known manner with the motor 1 as by a pin and slot connection, not shown, to permit a limited axial movement of the shaft. The opposite end of the shaft is removably secured in fixed relation to the transmission unit 10 and for this purpose is provided with an enlarged sleeve 61 which is secured in any suitable manner to the shaft 3 so as to rotate therewith and is provided with screw threads 62 adapted to have threaded engagement with the aperture 60 in the shaft 58.

The threads 62 are so constructed that when the shaft 3 is rotated by the motor 1, the threads will tend to screw sleeve 61 and shaft 3 inwardly into the shaft 58 for maintaining a driving connection between said shafts for rotating the shaft 58 in one direction. The flexible shaft 3 is mounted in the usual manner in a flexible casing 64 which is removably secured at its ends by nuts 65 to the adjacent portion of the motor case 1 and extension 59.

It will thus be seen that the flexible shaft 3 may be readily removably secured to the drive shaft 58 after the casing 64 has been secured to the extension 59 by screw threading the nut 65 on said extension by merely operating the motor 1. The shaft 3 may be constructed in any suitable manner as by twisted strands of wire or the like, and it is to be understood that the shaft 3 will be driven in a direction which, when operating the transmission unit 10, will tend to tighten the strands of wire comprising said flexible shaft.

I preferably construct the worm 57 and worm gear 55 so that the end thrust of said worm and, therefore, the shaft 58 will normally be in the direction away from the flexible shaft 3 and in order to overcome this end thrust with a minimum amount of friction, I have provided a thrust ball 67 mounted in the end of a cap 68 in axial alignment with the shaft 58 for engaging the end thereof, the cap 68 being secured to the case section 49 as by screws or other suitable means.

As hereinbefore stated, the crank shaft 44 is rotatively mounted in the sleeve 52 and in order that motion may be transmitted from the sleeve 52 to the shaft 44 and thence to the crank arm 43 and wiper blades 16 through the medium of the cable 33 and pitman 41, I have provided a novel time clutch mechanism 69 associated therewith and a control whereby the operation of the clutch may be manually governed. This clutch comprises the sleeve 52 which is provided, in this instance, in the end adjacent the crank arm 43 with an aperture 70 in the periphery thereof in which is adapted to be engaged a tooth 71 provided adjacent one end of a clutch pawl 72 which is pivotally mounted intermediate its ends upon a pin 73 secured to the crank arm 43 in spaced relation to the crank pin 42 as illustrated in Figures 5, 6 and 7. Although I have shown but one aperture 70 in the sleeve 52, it is obvious that two or more apertures may be provided, depending upon the desired degree of movement of the clutch sleeve before the engagement of the clutch.

The tooth 71 is normally urged toward the sleeve 52 for engaging the aperture 70 by means of a spring 74 connected at one end to the outer end of the pawl 72 adjacent the tooth 71 while the other end of the spring 74 is connected to an extension 43' of the crank arm 43. The opposite end of the pawl 72 extends, in this instance, outwardly from the pivot 73 at substantially right angles to the end of the pawl having the tooth 71 and is provided near the outer end thereof with a recess or notch 75 adapted to receive therein a stop shoulder 76 provided on a bar 77 secured at one end to the body of the housing section 7 and at the other end to a lateral L-shaped projection 78 provided at the upper edge of said housing section.

The housing section 7 is also provided with an L-shaped extension 79 at the lower side thereof opposite the extension 78 and the case 47 is slidably mounted on the housing section 7 by means of a plurality of, in this instance three, retaining bolts 80, two of which are mounted in the housing portion 78 and extend through elongated slots 81 provided in the adjacent upper edge of the case section 48 near the respective ends thereof. The other bolt 80 is mounted in the lower side of the case section 48 at the outer side thereof and extends through an elongated slot 82 provided in the extension 79 of the housing portion 7.

The bolts 80 are each provided with a spring 83 coiled about the outer end thereof between a cotter pin 84 mounted in the bolt and the adjacent portion of the housing 7 or case 47, as illustrated in Figures 2 and 4. These springs are tensioned to yieldingly maintain the case 47 in frictional contact with the housing portion 7 and at the same time permit a limited amount of relative movement of the case and housing 7. The case 47 is also provided with a cam plate 86 which may be formed integral with the case 47 or made separate therefrom and secured thereto as by screws 87, as illustrated in Figures 1 and 4.

The cam plate 86, in this instance, extends outwardly from one side of the case section 48 and is provided with a cam recess 88 extending therethrough and which is adapted to receive a cam 89 mounted eccentrically on a shaft 90.

The cam 89 is fixed to the shaft 90 so as to be rotated thereby while the shaft 90 is journaled in a hollow boss or stud 91 secured to the adjacent portion of the housing section 7. The shaft 90 extends outwardly from the member 91 and cam 89 and has mounted on the outer end thereof a suitable lever 92 by which the shaft and cam may be manually actuated. The shaft 90 may be of sufficient length to extend through the adjacent wall of the body of the vehicle, depending upon the position of the housing support 6 for conveniently positioning the handle 92 whereby the same may be manipulated.

The cam 89 and recess 88 are so related that when the shaft 90 is rocked in one direction or the other, they will produce a corresponding reciprocating movement of the case 47 and the mechanism carried thereby.

It will, therefore, be observed that inasmuch as the stop bar 77 is fixedly secured to the housing section 7 that any reciprocative movement of the case 47 will produce a corresponding movement of the clutch 69 toward or from the stop bar 77 so that the clutch pawl may be moved from a position where the stop shoulder 76 will be in the path of movement of said pawl for engaging the notch 75 or be moved to a position remote from said stop bar where the pawl may freely rotate without engaging the stop 76.

It will, therefore, be observed that when the cam is operated to move the case 47 outwardly away from the stop bar 77, to the outermost position thereof, that the pawl 72 is free to be actuated by the spring 74 for maintaining the tooth 71 into engagement with the tooth aperture 70 of the sleeve 52 so that the crank arm 43 will be locked to the sleeve and be continuously driven thereby. On the other hand, when the cam 89 is operated in the opposite direction for moving the case 47 inwardly toward the stop bar 77, the stop 76 will be thereby brought into the path of movement of the outer end of the pawl 72 so that when the pawl engages the stop it will be rocked thereby about the pin 73 against the action of the spring 74 until the tooth 71 is brought out of engagement with the tooth aperture 70 of the sleeve 52, thereby disconnecting the crank arm 43 with the constantly rotating sleeve 52 and the crank arm will be prevented from further rotary movement by the engagement of the stop 76 with the wall of the notch 75.

It will now be understood that when the clutch pawl 72 is in clutching engagement with the sleeve 52 that the pitman 41 will be reciprocated through the medium of the crank arm 43 for producing a corresponding reciprocative movement of the wiper blade 16 through the medium of the cable 33, and in order that the operation of the motor 1 may be automatically discontinued when the drive connection between the clutch elements 72 and 52 is disconnected, I have provided the switch 95 in the circuit for the motor.

This switch comprises a spring terminal bar 96 and a fixed terminal member 97 which are mounted in insulated spaced relation upon the housing section 8, as illustrated in Figure 1. The terminal bar 96 is so positioned that when the pitman 41 is in the extreme forward position as produced by the crank arm 43 when the clutch 69 is in its inner position in engagement with the stop 76, that said terminal will be in the path of movement of the pitman 41 or an element actuated thereby to be actuated by the operation of said pitman whereby the switch 95 will be opened for breaking the circuit for the motor 1.

In order that the switch 95 may thus be controlled by the action of the pitman 41, I have provided a contact control member 99 which, in this instance, comprises a circular disk composed preferably of insulating material and which is mounted upon the stud 40 intermediate the pitman 41 and the tie plate 34.

It will now be readily understood that the transmission unit 10 is free to be moved in a direction toward and from the wiper blade shafts 15 by the manipulation of the cam 89 due to the fact that the cam plate 86 and the case 47 are slidably connected with the supporting housing 6 and that such sliding movement of the transmission case 47 will produce a corresponding rotary movement of the wiper shafts 15 and the blades 16 associated therewith through the medium of the pitman 41, cable 33, sheaves 24 and clutch elements 27 and 31.

The amount of the reciprocative movement of the transmission unit 10 relative to the support 6 obviously depends upon the construction of the cam 89 and cam recess 88 together with the degree of movement of the cam, and these control elements are so related that when the transmission unit 10 is moved from the inner position to the outer position thereby, the wiper blades 16 will be manually moved from the parking position into the wiping zone at the side thereof adjacent said parking position.

This outward movement of the transmission unit 10 will, of course, produce a corresponding longitudinal movement of the pitman 41 which is sufficient to bring the contact control member 99 out of engagement with the terminal 96 so that said terminal is then free to move into engagement with the terminal 97 for closing the circuit for the motor 1.

When the transmission unit 10 is in its outermost position, the clutch pawl 72 is free to be moved by the action of the spring 74 into clutching engagement with the clutch collar 52 as shown in Figure 6. In other words, when the windshield wiper is in operation, the transmission unit 10 will be in its outermost position and the clutch pawl 72 will be in clutching engagement with the clutch collar 52 so that the crank arm 43 will be rotated about the axis of the shaft 44 through the medium of the clutch pawl with the result that the pitman 41 will reciprocate the tie plate 34 and produce a corresponding movement of the cable 33 which, in turn, will produce an oscillatory movement of the wiper arms 21 for moving the wiper blades 16 through a definite path of movement designated as the wiping zone, as N Figure 17.

When the windshield wiper drive elements are thus in the operative position, it will be noted that the clutch pawl 72 will be maintained in spaced relation to the stop bar 77 so that the stop shoulder 76 will be out of the path of movement of the clutch pawl 72, as illustrated in Figure 6, so that the arm is free to rotate about the axis of the crank shaft 44 and that the inner end of the pitman 41 is so positioned that it may freely reciprocate between the sheaves 24 without bringing the contact control member 99 into engagement with the switch terminal 96.

When it is desired to discontinue the operation of the windshield wiper, this may be readily effected by simply moving the handle 92 in a manner to move the transmission unit 10 to its innermost position, as illustrated in Figure 5. When the transmission unit 10 is thus brought to its innermost position, the clutch 69 will be carried inwardly into such a position relative to the stop bar 77 that the stop shoulder 76 will be in the path of movement of the outer end of the clutch pawl 72 so that when the pawl passes the shoulder 76, said shoulder will engage the outer or free end of the pawl and rock the same inwardly about the axis of the pin 73 and thereby produce a corresponding outward movement of the opposite end of the pawl and will bring the tooth 71 out of engagement with the tooth aperture 70 and thereby disconnect the clutch sleeve from driving connection with the crank arm 43.

The relation of the clutch pawl 72 and stop bar 77 are such that when the tooth 71 is out of engagement with the aperture 70 the shoulder will engage the upper wall of the notch 75 of the clutch pawl and will thereby coact with the spring 74 for locking the crank arm 43 against further rotary movement. Furthermore, the relation of the clutch pawl 72 and the pivotal connection 42 between the pitman 41 and crank arm 43 is such that when the crank arm is held against further forward rotary movement by the co-action of the pawl with the shoulder 76 the pivot 42 will be positioned beyond, in the direction of movement, a straight line passing between the stud 40 and shaft 44 or in other words past dead center so that the crank arm 43 will be prevented from being moved rearwardly by the action of the spring 74 or any other means by the frictional resistance of the wiper blades and driving mechanism immediately associated therewith.

When the clutch pawl 72 is thus brought out of clutching engagement with the sleeve 52, said sleeve is obviously free to be rotated by the action of the motor 1 through the medium of the flexible shaft 3, drive shaft 58 and gears 57 and 55, but owing to the fact that the center of pivotal movement of the crank arm 43 has been moved inwardly toward the wiper shafts 15 to bring the clutch 69 into operative engagement with the stop shoulder 76, the switch 95 will be opened by the engagement of the contact control member 99 with the terminal element 96 as the crank pin 42 approaches dead center so that by the time the clutch tooth 71 is out of clutching engagement with the sleeve 52 the circuit to the motor 1 will have been broken with the result that the sleeve will be rotated forwardly a very short distance by the momentum of the motor so as to bring the aperture 70 out of registration with the tooth 71 when the motor and the clutch sleeve 52 driven thereby cease to operate, as illustrated in Figure 5.

When it is desired to again cause the wiping mechanism to operate, the case 47 is again moved outwardly by the manipulation of the cam 89 and as the case and transmission mechanism carried thereby are moved away from the stop bar 77, the clutch pawl 72 will be removed from the stop shoulder 76 with the result that the tooth 71 will be moved inwardly toward the clutch sleeve 52 by the action of the spring 74 until said tooth engages the adjacent peripheral surface of the sleeve, as illustrated in Figure 7.

As the clutch tooth 71 is thus moved into engagement with the clutch sleeve, the switch 95 will be permitted to close, due to the fact that the contact control member 99 will be moved out of engagement with the terminal element 96 so that current will then be supplied to the motor 1 causing said motor to begin to operate.

Inasmuch as the clutch sleeve 52 must rotate nearly one complete revolution before the tooth aperture 70 is again brought into registration with the tooth 72, it will be obvious that the motor 1 will obtain substantially full speed by the time the tooth 71 is brought into clutching engagement with the sleeve.

It will thus be clearly understood that the motor, owing to the construction of my novel clutch mechanism, is permitted to operate under a very light load until the same has substantially obtained its normal speed before picking up the load incident to operating the cleaner blades. This is particularly advantageous when the load is especially heavy as when the cleaner blades are imbedded in snow or frozen to the windshield glass or in case the motor becomes temporarily inefficient as when a considerable period of time lapses between operations of the windshield wiper.

The structure shown in Figure 12 operates by the same general principle as the structure shown in Figures 1 to 11 inclusive and illustrates a modified arrangement of the drive connection between the sheaves 24 and the wiper shafts 15 which is particularly applicable to be used where there is a very limited amount of available space adjacent the cleaner shafts. The structure illustrated in this figure is particularly adapted to be used when it is necessary or desirable to mount a wiper or cleaner shaft in the windshield body in close proximity to the opening for the windshield.

The structure shown in Figure 12, like that illustrated in Figures 1 to 11 inclusive, is adapted to be used in connection with a dual wiper assembly and the wiper shafts 15 are mounted in the frame as 20' adjacent the opening for the windshield W. Each shaft extends at one end outwardly beyond the frame 20' and has the wiper drive arm 21 secured thereto. The other end of each shaft 15 terminates inside of the frame 20' in slightly spaced relation to the interior wall or lining L of the vehicle body and is journaled in suitable spaced bearings 110 secured to or made integral with the lower face of the supporting housing 6. The housing 6, instead of being arranged in a vertical position, as illustrated in Figures 1, 2, 5 and 8, is in a horizontal position above the shafts 15 and is secured to a frame 20' by rivets 111 or other suitable means as by spot welding, screws, etc.

Positioned between the bearings 110 and mounted upon each shaft 15 to rotate therewith is a spiral gear 112 which is in meshing engagement with a similar spiral gear 113 which, in turn, is mounted upon the lower end of a vertically disposed shaft 114. Each shaft 114 is journaled in a suitable bearing 115 secured to the housing section 8 in any suitable manner. Each shaft 114 extends above the housing 6 and has mounted thereon a sheave 24. The shafts 114 may extend a shorter or greater distance above the housing 6 depending upon the structure of the vehicle body and the sheaves 24 are mounted on the shafts in the manner hereinbefore described and as more clearly illustrated in Figure 8.

The sheaves 24 in the structure illustrated in Figure 12 may be operably connected by the cable 33 in the manner shown in Figure 1 for operating said sheaves and the cleaner blades connected therewith in unison.

In the structure illustrated in Figure 12, the wiper blades may be oscillated simultaneously in the same direction or they may as readily be operated in opposite direction, depending upon the arrangement of the gears 112 and 113 of each wiper blade drive assembly. That is, if the gears 112 are positioned at the same side of the gear 113 for both shafts 15, it is obvious that the wiper blades will be simultaneously oscillated in the same direction, whereas if one of the gears 112 is positioned at one side of its respective gear 113 and the other gear 112 positioned at the opposite side of its respective gear 113, then it follows that the wiper blades will be operated in opposite directions without its being necessary to alter the positioning of the cable 33, as shown in Figure 1. Likewise, when the structure shown in Figure 1 is used, the blades may be oscillated in reverse directions, if desired, by merely arranging the cable 33 so that the runs thereof will cross each other intermediate the sheaves 24 in the manner well known to those skilled in the art. If the cable is arranged so that the runs cross each other for driving the wiper blades in opposite directions, it is obvious that the arrangement of the guide slots 45 in the housing section 8 and the switch 95 will necessarily be altered from that shown in Figure 2 to conform with this change in the positioning of the cable 33.

In Figure 13 I have shown another modified structure wherein the device illustrated in Figures 1 to 11 inclusive is applied to a broken or V-type windshield. When the wiper is to be used with the V-type windshield, the transmission unit 10 and drive assembly for the wiper blades are constructed and operated very similarly to that illustrated in Figures 1 to 11 inclusive with the exception that the supporting housing section as 8' is formed V-shaped in plan view to conform to the contour of the windshield or adjacent portion of the vehicle frame. The wiper shafts 15 are mounted in the housing to extend at an angle to each other and a cable guide 120 is mounted upon the housing section 8' at the apex thereof intermediate the shafts 15. The cable guide 120, as shown in Figures 13 and 14 comprises a supporting shaft 121 mounted at its ends in supporting plates or members 122 and 123 respectively which are secured in any convenient manner to the adjacent portion of the housing section 8'.

Upon the shaft 121 is journaled a pair of guide pulleys 124 which are arranged in axial spaced relation for guiding the corresponding run of the cable 33.

Figure 15 shows a modified form of cable guide means which is adapted to be used with a V-type windshield structure and particularly when the wiper blade drive assembly is arranged and constructed in the manner disclosed in Figure 12. This guide means shown in Figure 15 comprises a supporting plate 130 secured by rivets or other means to the housing section 8' at the apex thereof. The plate 130 is provided with a pair of spaced upwardly extending pins 131 upon which is journaled corresponding guide pulleys 120 adapted to guide the cable 33 in its passage across the apex of the frame during the operation thereof.

In Figure 16 I have illustrated a modified form of cleaner blade drive assembly in that control means is provided whereby the blade may be maintained inoperative during the operation of the other blade. This control means, as illustrated, comprises a latch 135 secured to the inner end of the shaft 15 adjacent the clutch plate 27. The latch is fixedly secured to the shaft 15 so as to move therewith and extends outwardly a short distance beyond one side of the clutch member 27 for engaging in a recess 136' of a detent 136 which is secured to an operating shaft 137.

The shaft 137 may be journaled in any suitable manner in the adjacent portion of the support or housing 6 and is arranged to extend outwardly through the adjacent portion of the vehicle body and may be provided with a handle at the outer end thereof by which the shaft may be rotated in the manner illustrated for the shaft 90 whereby the detent 136 may be moved to and from the operative position. The detent 136 is yieldingly maintained in either the operative or inoperative position by a spring pawl 138 which has one end thereof secured to the housing 6 and the other end adapted to engage in the serrated edge surface 139 of the detent.

In operation, the cleaner blade as 16 may be permitted to operate in the usual manner by positioning the detent 136 in the inoperative position, as illustrated by broken lines in Figure 16, so that the latch 135 may swing freely. When it is desired to maintain the blade 16 inoperative, while continuing the use of the other blade, the detent 136 is first moved to the operative position as shown by full lines, after which the cleaner blades are brought to the parking position by the manipulation of the cam 89 in the manner hereinbefore described.

As the blades approach the parking position, the latch 135 will swing upwardly into engagement with the detent 136 and will move said detent outwardly toward the inoperative position against the action of the spring 138 until the outer end of the latch registers in the recess 136' as the blade comes to the parking position, whereupon the blade and corresponding shaft will be secured by the latch and detent against further rotary movement. The operation of the windshield wiper is then caused to be resumed by the manipulation of the cam 89 for actuating the free blade only.

Inasmuch as the shaft 15 having the latch 135 connected thereto is maintained against rotation by the detent, the clutch teeth 29, during the initial movement of the corresponding sheave 24, will be moved out of registration with the clutch apertures 30 after which the corresponding sheave 24 is free to be moved by the cable 33 with only a relatively slight frictional resistance to such movement produced by the engagement of the clutch teeth 29 with the smooth outer surface of the clutch plate 31.

When it is again desired to utilize the idle cleaner blade, this may be readily accomplished by stopping the operation of the windshield wiper by the manipulation of the cam 89, after which the detent 136 may be moved to its inoperative position for releasing the latch 135.

As the windshield wiper mechanism is brought to the at-rest position with the operating blade in the parking position, the clutch plate 27 connected with the idle blade will again come into clutching engagement with the companion clutch plate 31 by the entrance of the teeth 29 into the apertures 30 so that as the operation of the windshield wiper is again continued the cleaner shaft 15 having the latch 135 will be driven in the usual manner through the medium of the sheave 24.

In Figures 18 and 19 I have shown a modified form of cable sheave 24' which is composed primarily of sheet metal stampings. This sheave comprises outer side plates 135 and 136 and an intermediate plate 137 which, together with the clutch element 31 are mounted upon a shouldered bushing 138. The bushing 138 has the sides thereof flattened and the plates 135, 136, 137, and clutch element 31 are each provided with a corresponding central aperture adapted to receive the bushing 138 therethrough.

These plates and clutch elements are clamped in position on the bushing between the shoulder and the outer end thereof which is riveted upon the clutch element 31. The intermediate plate 137 is of less diameter than the outer side plates to form a cable groove 139. The outer plates are each provided at one side with outwardly projecting ears 135' and 136' respectively and these ears are provided with aligned openings for receiving a clamping screw 140 which is screw threaded in one of the plates as 135 which, as shown, is composed of heavier stock than the other plate 136.

It is thus seen that the screw 140 extends across the cable groove 139 so that by tightening the screw the plates may be brought into clamping engagement with the adjacent portion of the cable.

The bushing 138 is provided with a central opening 141 extending axially therethrough for the reception of a wiper shaft 15. The sheave 24' is mounted upon the shaft 15 in the same manner as illustrated more particularly in Figure 8, between a washer or collar 25 and the outer clutch element 27.

In Figure 20 I have illustrated a modified form of tie plate 34' for the cable 33. This plate is composed of two sections 145 and 146 which are arranged with their inner ends in overlapping relation and are adjustably clamped together by screws 147.

One of the tie plate members as 145 is provided with an elongated slot 148 through which the screws 147 extend to permit the relative adjustments of the plate members. The ends of each of the plate members are bent laterally and are each provided with an eyelet 149 therethrough. These apertures are spaced a distance from the outer end of the corresponding end of the plate members and are connected with said ends by a slot 150.

The ends of the cable 33 have permanently secured thereto by any suitable means, as by solder or the like, a shouldered sleeve 151. The diameter of the eyelets 149 is substantially equal to or slightly greater than that of the sleeve 151 for receiving the sleeve therein while the slot 150 connecting the eyelet with the outer edge of the plate section is of less width than the diameter of the eyelet and substantially equal to that of the cable 33 for easily receiving the cable therethrough.

It will thus be seen that the ends of the cables may be readily attached to the tie plate 34' by first inserting the cable through the slot 150 in the corresponding end of the plate until the sleeve 151 aligns with eyelet 149 and then the sleeve may be drawn into the eyelet until the shoulder of the sleeve abuts against the corresponding side of the plate end. One of the tie plate sections as 145 is provided with an enlarged circular portion 153 which has an aperture 154 adapted to receive the stud 40 therethrough. The portion 153 may also be provided with a laterally extending lug 155 which is formed integral with the plate section and is adapted to extend into a slot, not shown, provided in the periphery of the contact control member 99 for preventing said control member from rotating on the stud 90 which is often desirable, particularly when the contact control member is formed with a cam portion to effect the rapid opening of the switch 95 at the end of the inward stroke of the pitman 41.

It will now be understood that I have provided a windshield cleaner which is not only simple in operation and construction but also is readily adapted to be applied to various body structures and to be adjusted to effectively function under various structural conditions. For instance, the cleaner blades 16 may be readily adjusted so as to move through a predetermined wiping zone by adjusting one or both sheaves 24 relative to the cable 33 by merely loosening the corresponding clamp 38. Also the position of the blades when parked may be readily governed by altering the size or degree of throw of the cam member 89. Furthermore, owing to the length of the pitman 41 relative to the throw of the crank arm 43, I have produced a structure which will operate with substantially uniform mechanical efficiency and thereby provide a mechanism which will operate with a minimum amount of power or current.

Although I have shown and described the preferred embodiment of my novel windshield wiper together with certain modifications thereof, I do not wish to be limited to the exact construction shown and described as various changes both in the form and relation of the parts thereof may readily be made without departing from the spirit of the invention as set forth in the appended claims.

I claim:

1. In a windshield cleaner, a wiper-operating shaft, a drive element for operating said shaft, means including a power transmission mechanism operatively connecting the drive element with the shaft comprising a clutch including relatively movable elements having operative engagement with each other only at a predetermined position thereof with respect to each other and adapted to be actuated by the drive element to provide the clutch with a time lag whereby the drive element will be automatically connected with the shaft only after a predetermined amount of movement of the drive element following a slight movement thereof relative to the driven element as the clutch is being disengaged, clutch control means, a manually operated element cooperating with the transmission mechanism and said control means to engage or disengage the clutch and means actuated by the transmission mechanism when the clutch has been disengaged for controlling the operation of the drive element.

2. In a windshield cleaner, a wiper operating shaft, a drive element for operating said shaft, a transmission unit operatively connected with the drive element including a pair of clutch elements, means operatively connecting one of the clutch elements with the wiper shaft, a clutch control member normally spaced from the clutch elements, manually operated means co-acting with the transmission unit for producing relative movement of at least one of the clutch elements and said control member toward each other to disengage the clutch, and means independent of the manually operated means rendered effective by said relative movement for controlling the operation of the drive element.

3. A windshield cleaner having a wiper operating shaft and a drive element therefor, power transmission means operatively connecting the drive element with the shaft including a clutch, means for controlling the operation of said clutch including a clutch control member mounted independently of and in predetermined relation with the wiper operating shaft, and manually operable means for producing relative movement of said member and at least one of the clutch elements whereby said member will operatively engage said clutch element at a predetermined relative position of said element and member to automatically disengage the clutch when said wiper shaft is in a predetermined position.

4. A device as in claim 3 wherein said clutch control member and the clutch element engaged thereby are provided with means adapted to have locking engagement with each other to maintain said element against continued movement and thereby hold the wiper shaft in the predetermined position.

5. A windshield cleaner comprising in combination a cleaner arm movable in a given path, a drive mechanism for said cleaner arm embodying a pair of clutch elements, separate clutch control means normally arranged out of cooperative relation with each other, one of said control means being arranged in predetermined relation with the path of movement of the cleaner arm, and manually operated means for shifting at least a portion of the drive mechanism with respect to the cleaner arm whereby said drive mechanism will alter the path of movement of the cleaner arm and bring said separate clutch control means into cooperative relation with each other to automatically effect disengagement of the clutch elements at a predetermined position of the wiper arm.

6. In combination, a cleaner arm, a drive mechanism embodying an operating element having a definite normal stroke operatively connected with the cleaner arm for operating said arm through a normal wiping zone, means for producing relative movement of the drive mechanism and cleaner arm whereby the cleaner arm will be moved beyond the normal wiping zone into a parking zone by the drive element during said normal stroke of said element, a clutch control member mounted in predetermined relation with the parking zone and mechanical means including a clutch incorporated in the drive mechanism and controlled by the cooperation of said drive mechanism and the control member at a predetermined position of the operating element for disconnecting said mechanism from the cleaner arm when said arm is in the parking zone.

7. In combination, a cleaner arm, a drive mechanism embodying an electric motor and a drive element having a definite normal stroke operatively connected with the cleaner arm for operating said arm through a normal wiping zone, means for producing relative movement of the drive element and cleaner arm whereby the cleaner arm will be moved beyond the normal wiping zone by the drive element during said normal stroke of the element, a clutch control member mounted in predetermined relation with the wiping zone, a clutch incorporated in the drive mechanism and controlled by the cooperation of said drive mechanism and the control member at a predetermined position of the drive element for disconnecting said drive mechanism from said cleaner arm when the latter has reached a predetermined position beyond said normal wiping zone, and a switch for starting and stopping the motor controlled by the drive mechanism independently of the clutch.

8. A windshield cleaner comprising, in combination, a cleaner arm, a motor and a support, power transmission means including a clutch mounted on the support operatively connecting the motor to said cleaner arm for producing a definite stroke of the cleaner arm through the normal wiping zone, manually operated means for shifting the transmission means on the support relative to the cleaner arm so as to move the cleaner arm beyond the normal wiping zone, and clutch control elements connected with the support and one of the clutch elements respectively and positioned to be brought into cooperative relation with each other by the said shifting of the transmission means so as to co-act at a predetermined relative position of the cleaner arm for automatically disengaging said motor from said cleaner arm.

9. A windshield cleaner comprising, in combination, a cleaner arm, a motor, power transmission means including a clutch operatively connecting the arm to said motor for producing a definite stroke of the cleaner arm through a normal wiping zone, manually operated means for shifting the transmission means relative to the cleaner arm whereby the motor may move the cleaner arm beyond the normal wiping zone into a parking zone, co-acting means including a control member mounted in fixed relation with the parking zone for dis-engaging said clutch whereby said motor will be automatically disengaged from said arm when the latter is in the parking zone, and means including a switch actuated by the transmission means when the clutch is disengaged for automatically controlling the operation of the motor.

10. In a windshield cleaner having a cleaner arm, a motor and a support, power transmission means movably mounted on the support and including a clutch having a clutch operating member connected with one of the clutch elements to move therewith operatively connecting the arm to said motor, said power transmission means embodying a drive member having a definite cycle of movement for moving the cleaner arm back and forth through a normal wiping zone, manually operated means for shifting the power transmission means on the support toward the wiper arm whereby said arm will be moved by the drive member beyond the normal wiping zone, and clutch control means mounted on the support in fixed relation with the wiping zone rendered effective by said movement of the power transmission means to actuate said clutch operating member at a predetermined position thereof only for automatically disengaging the clutch and thereby disconnecting said motor from said arm when the latter has reached a predetermined position beyond the normal wiping zone.

11. A windshield cleaner comprising, in combination, a cleaner arm, a drive mechanism including a clutch and a motor for operating the cleaner arm through a normal wiping zone, manually operated means including a control element adapted when moved in one direction to shift at least a portion of the drive mechanism toward the cleaner arm whereby said drive mechanism will move the cleaner arm out of the wiping zone into a parking zone and when said element is moved in another direction to restore the cleaner arm to the wiping zone, and means including a motor power supply control member operatively connected with the power transmission means and a clutch control member associated with the clutch rendered operative by said alterations in the driving relation of the drive mechanism with the cleaner arm for automatically disengaging said drive mechanism from said arm and for shutting off the supply of power to the motor by said movement of the control element in said first mentioned direction so that said motor may subsequently coast to stop, and when said control element is moved in said second mentioned direction to automatically restore the supply of power to the motor to cause said motor to operate and to engage said drive mechanism with said arm, said clutch including cooperating clutch members spaced with respect to each other by said coasting of the motor to provide a time lag between the disengagement and the engagement of the clutch.

12. A windshield cleaner comprising, in combination, a cleaner blade drive assembly, a power transmission mechanism including a clutch operatively connected with the drive assembly for actuating the cleaner blade back and forth on the windshield, a motor mounted remote from the transmission mechanism and operatively connected with said transmission mechanism, manually operable means for shifting the transmission mechanism relative to the cleaner blade drive assembly whereby the blade will be moved to a position at one side of its former path of movement, said clutch including a spring actuated element, and clutch control means mounted independently of the manually operable means rendered operative by said altered relation of the power transmission means and drive assembly to actuate said clutch element against the action of the spring at a predetermined position of said clutch element for automatically disengaging the clutch and thereby disconnecting the power transmission means from said motor.

GORDON B. SAYRE.